(12) United States Patent
Barthes et al.

(10) Patent No.: US 12,275,529 B2
(45) Date of Patent: Apr. 15, 2025

(54) DRIVEN TURBOCOMPRESSOR OF AN AIR CONDITIONING SYSTEM HAVING OPTIMIZED COOLING

(71) Applicant: LIEBHERR-AEROSPACE TOULOUSE SAS, Toulouse (FR)

(72) Inventors: Guillaume Barthes, Toulouse (FR); James Fouragnan, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 152 days.

(21) Appl. No.: 18/019,818

(22) PCT Filed: Jul. 28, 2021

(86) PCT No.: PCT/EP2021/071203
§ 371 (c)(1),
(2) Date: Feb. 5, 2023

(87) PCT Pub. No.: WO2022/028992
PCT Pub. Date: Feb. 10, 2022

(65) Prior Publication Data
US 2023/0286657 A1 Sep. 14, 2023

(30) Foreign Application Priority Data
Aug. 4, 2020 (FR) ...................................... 2008266

(51) Int. Cl.
*B64D 13/02* (2006.01)
*B64D 13/06* (2006.01)
(Continued)

(52) U.S. Cl.
CPC ............. *B64D 13/02* (2013.01); *B64D 13/06* (2013.01); *F02B 37/04* (2013.01); *F02B 39/005* (2013.01);
(Continued)

(58) Field of Classification Search
CPC .................. B64D 13/02; B64D 13/06; B64D 2013/0603; B64D 2013/0644;
(Continued)

(56) References Cited

U.S. PATENT DOCUMENTS 4,419,926 A * 12/1983 Cronin ................... B64D 13/06 454/74
2015/0337850 A1* 11/2015 An ........................ F04D 29/284 417/423.13

FOREIGN PATENT DOCUMENTS

CN 109372775 A * 2/2019 ........... F04D 25/045

\* cited by examiner

*Primary Examiner* — Loren C Edwards
(74) *Attorney, Agent, or Firm* — CRGO Global; Steven M. Greenberg

(57) ABSTRACT

The invention relates to a driven turbocompressor of an air conditioning system, comprising a compressor (12) which is connected to an air intake duct (14) and to an inlet (112) of a cabin of a vehicle, and is configured to receive air from the air intake duct (14), to compress it and to provide it to the cabin, a motor (16) that is configured to drive the compressor (12) and is surrounded by a casing (18), a recovery turbine (26) that is configured to expand the cabin air (24) coming from an outlet (114) of the cabin. The device is characterized in that it comprises a cooling duct (32) configured to receive at least part of the expanded air (28) so as to cool the casing (18) of the motor and the motor (16).

9 Claims, 1 Drawing Sheet

(51) Int. Cl.
 *F02B 37/04* (2006.01)
 *F02B 39/00* (2006.01)
(52) U.S. Cl.
 CPC ............... *B64D 2013/0629* (2013.01); *B64D 2013/0644* (2013.01); *B64D 2013/0648* (2013.01)
(58) Field of Classification Search
 CPC . B64D 2013/0648; B64D 13/08; F02B 37/04; F02B 39/005; F02B 39/08; F02B 39/085; F02B 39/10
 See application file for complete search history.

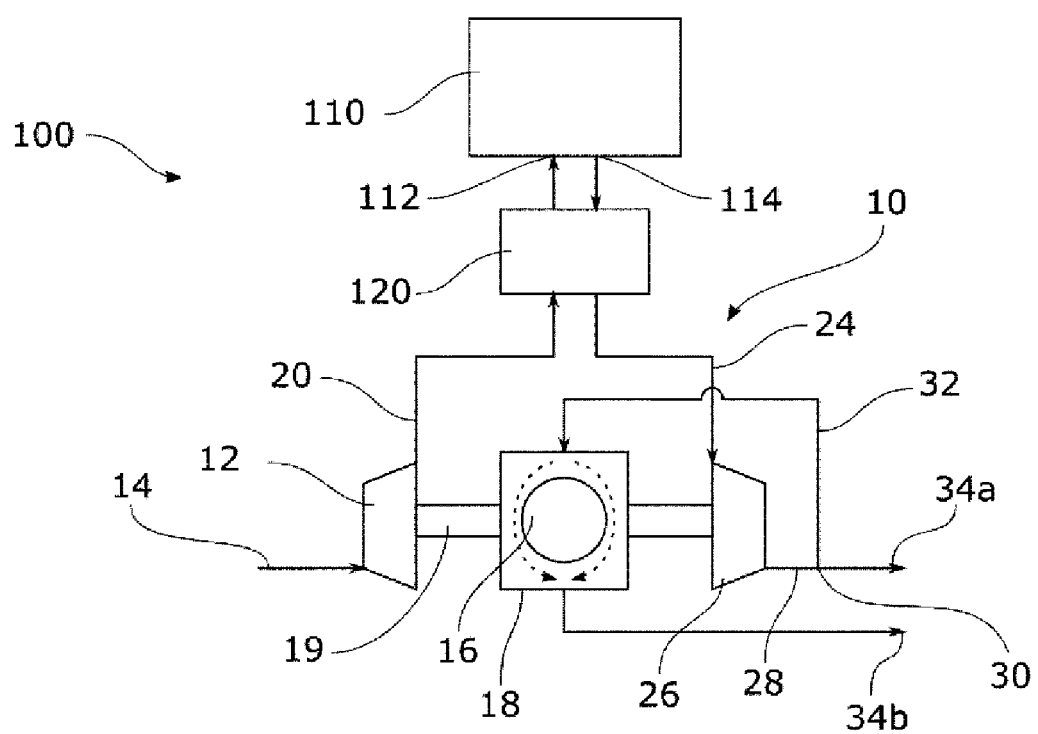

DRIVEN TURBOCOMPRESSOR OF AN AIR CONDITIONING SYSTEM HAVING OPTIMIZED COOLING

CROSS-REFERENCE TO RELATED APPLICATIONS

This application is a § 371 national phase entry of International Application No. PCT/EP2021/071203, filed Jul. 28, 2021, which claims priority to French Patent Application No. 2008266 filed on Aug. 4, 2020.

TECHNICAL FIELD OF THE INVENTION

The invention relates to a driven turbocompressor that is part of an air conditioning system. The invention especially relates to a driven turbocompressor with optimized cooling, which can for example be used in a vehicle comprising an air conditioning system, for example of the aeronautical, rail, or maritime type.

TECHNOLOGICAL BACKGROUND

Driven turbocompressors are used in several contexts, especially in vehicles, for example in an air conditioning system.

These driven turbocompressors generally comprise a compressor driven by the motor and allowing the compression of the outside air. A significant problem raised in these turbocompressors is the cooling of the motor of the driven turbocompressor.

On the one hand, in an air conditioning system, the main problem is to ensure this cooling without excessively affecting the performance and costs of the air conditioning system, especially by limiting the use of external cold air removal and/or by not causing additional demand for pressurized air which would lead to a greater need for heating, which is counterproductive.

The cooling of the motor must especially be sufficiently effective to allow a power density that is compatible in terms of mass and size with integration into an on-board system, especially a vehicle, for example an aircraft.

Furthermore, the temperature levels to which the components of the driven turbocompressor and in particular the motor are subjected must be controlled in order to prevent any malfunction, and must be compatible with the reliability levels required in on-board systems, especially the very high levels of reliability required in an aeronautical application.

The energy consumed by cooling the motor must remain low so as not to negatively influence the overall efficiency of the system wherein it is embedded. These considerations of efficiency and energy performance make it possible in particular to control the overall performance of the air conditioning system.

Finally, the efficiency must also be studied at the overall level, especially in terms of mass and complexity, which must remain reasonable, lest the overall performance of the vehicle be penalized.

Solutions proposed in the prior art consist of cooling the motor by heat exchange with a liquid loop used as heat sink. In particular, in certain systems, in particular in the automotive field, a liquid loop is already used to cool other components and is directed towards the motor for cooling. However, this solution is complex to implement in the absence of a pre-existing liquid loop, and adds complexity and a drop in performance in an existing liquid loop due to the additional component to be cooled.

Another compressor motor cooling solution consists of ventilating with air collected from outside the vehicle.

In such a case, the ventilation flow rate is generally zero when the vehicle is stopped (especially on the ground for an aircraft). Fans are used to compensate for this absence of ventilation, which adds complexity to the system, and reduces energy performance. More generally, the collection of ventilation air causes the vehicle's performance to drop.

The inventors have sought to propose a new type of driven turbocompressor of an air conditioning system, allowing proper cooling of the motor.

AIMS OF THE INVENTION

The invention aims to provide a driven turbocompressor of an air conditioning system making it possible to overcome at least one of the disadvantages of the driven turbocompressors of the prior art.

The invention aims in particular to provide, in at least one embodiment, an energy-efficient driven turbocompressor of an air conditioning system.

The invention aims in particular to provide, in at least one embodiment, a driven turbocompressor usable regardless of the state of the vehicle and the outside conditions.

The invention aims in particular to provide, in at least one embodiment, a non-bulky, low-mass driven turbocompressor.

DISCLOSURE OF THE INVENTION

To do this, the invention relates to a driven turbocompressor of an air conditioning system for supplying air conditioning to a cabin of a vehicle, comprising:
- an air intake duct configured to collect ambient air at ambient pressure,
- a compressor connected to the air intake duct and to an inlet of the cabin, configured to receive air originating from the air intake duct, to compress the air originating from the air intake duct and to supply pressurized air at a pressure corresponding to the pressure needed to supply the cabin,
- a motor connected to the compressor by a transmission shaft, configured to drive the compressor and surrounded by a casing,
- an energy recovery turbine connected to an outlet of the cabin, and configured to expand the cabin air originating from the outlet of the cabin to supply expanded through the turbine via an outlet of the turbine, characterized in that it comprises a cooling duct connecting the outlet of the turbine and the casing of the motor, said cooling duct being configured to receive at least some of the expanded air, so as to cool the motor casing and the motor.

A driven turbocompressor according to the invention therefore makes it possible to provide efficient, energy-saving cooling of the motor, fully drawing from the air leaving the cabin. The term "cabin" is understood to mean the part of the vehicle receiving the elements transported by the vehicle, in particular the passengers of the vehicle. It is also called the passenger compartment.

In the context of its use in an air conditioning system, the main function of the compressor of the driven turbocompressor is to allow air from the air intake duct to attain or approximate the pressure required in the cabin.

An air treatment device of the air conditioning system can be arranged between the driven turbocompressor and the cabin in order to perform additional treatments, upstream or downstream of the cabin. In particular, the air treatment device comprises any element complementary to the driven turbocompressor for treating the air circulating in the air conditioning system between the compressor and the energy recovery turbine of the driven turbocompressor, for example one or more additional compressors to achieve higher compression ratios, one or more heat exchangers, a water extraction loop making it possible to extract water, one or more expansion turbines, etc.

The air leaving the cabin is initially expanded in an energy recovery turbine, up to a pressure close to the pressure outside the vehicle, which makes it possible to recover energy (expansion enthalpy) that can be used in the system in order to improve the overall energy efficiency. In addition, expansion in the turbine has the effect of reducing the temperature of the cabin air, and of condensing the water present in the cabin air to form droplets of water in suspension.

Thus, the expanded air is particularly effective in serving to cool the motor casing and the motor. For example, the expanded air is injected into a cooling circuit of the outer surface of the casing. This expanded air, which is colder than the motor, will cool the motor casing and the motor by thermal conduction, and the water in suspension in the expanded air will vaporize in the presence of the heat released by the motor and the motor casing, by absorbing this heat, so as to improve the cooling of the motor casing and the motor.

Using expanded air therefore makes it possible to cool more efficiently than in the devices of the prior art, or else to cool in the same way with a lower air flow rate, which improves the overall energy efficiency of the driven turbocompressor, of the air conditioning system wherein it is integrated, and of the vehicle wherein the air conditioning system is embedded.

If the air conditioning system comprises a water extraction loop, the cooling duct can comprise means for injecting the water extracted by the water extraction loop, configured to reinject the extracted water into the cooling duct in order to improve cooling.

The driven turbocompressor does not depend on an external system for cooling its compressor motor.

Advantageously and according to the invention, the energy recovery turbine is arranged on the transmission shaft.

According to this aspect of the invention, the compressor, the turbine and the motor are connected by the transmission shaft and thus form a driven turbocompressor made of a single part. The energy recovered by the turbine is thus used to reduce the motor energy consumption necessary to drive the compressor, which reduces the heat generated by the motor.

Advantageously and according to the invention, the driven turbocompressor comprises a bifurcation arranged between the outlet of the turbine and the cooling duct, the bifurcation comprising an inlet configured to receive the expanded air, and comprising at least two outlets, a first outlet configured to direct some of the flow of expanded air to the cooling duct, and a second outlet configured to direct another portion of the flow of expanded air to an exhaust outlet.

According to this aspect of the invention, the bifurcation makes it possible to balance the pressure at the outlet of the turbine; if all of the expanded air is sent into the cooling duct in order to cool the motor casing and the motor, a resulting pressure drop can reduce the overall performance of the system, especially the performance of the turbine.

By allowing passive balancing of the flow rates between the cooling duct and the outlet at the bifurcation, the turbine operates at its maximum performance (the ratio between the pressure at the inlet of the turbine and the outlet of the turbine is optimized) because the pressure drop downstream from its outlet is optimized, and the cooling of the cabin air is effective, which improves the cooling of the motor and the casing of the motor.

Advantageously and according to the invention, the bifurcation is configured so that a majority of the water suspended in the conditioned air is directed to the cooling duct.

According to this aspect of the invention, the bifurcation optimizes the water distribution of the cabin air sent to the cooling duct and the cabin air directly discharged. The presence of suspended water in the cabin air does not impact the pressure drop performance but is advantageous for cooling. Thus, the bifurcation is configured so that most of the water is transmitted to the cooling duct. This configuration can be done actively (controlled) or preferably passively (without intervention, which especially limits the energy consumed and the complexity of the system). For example, the bifurcation has a geometric shape in which the first outlet connected to the cooling duct is substantially collinear to the direction of the flow of conditioned air so that the water present in the flow is mainly directed toward this outlet, the second outlet being oriented at a different angle such that the water is preferably directed toward the first outlet.

Advantageously and according to the invention, the casing of the motor comprises cooling fins.

According to this aspect of the invention, the fins make it possible to maximize the cooling of the motor and the casing. The fins are made of a heat-conducting material to maximize heat exchanges.

According to other variants of the invention, any other device improving the heat exchange can be added to the motor casing.

The invention also relates to a method for supplying a cabin of a vehicle, characterized in that it comprises the following steps:
  compressing, via a compressor driven by a motor, air originating from an air intake duct, and directing that pressurized air, at a pressure corresponding to the pressure needed to supply the cabin, to an inlet of the cabin,
  expanding, via an energy recovery turbine, cabin air originating from an outlet of the cabin,
  directing at least some of the air expanded by the turbine to a casing of the compressor motor so as to cool said motor casing and said motor.

Advantageously, the supply method according to the invention is implemented by a driven turbocompressor according to the invention.

Advantageously, the driven turbocompressor according to the invention implements the supply method according to the invention.

The invention further relates to an air conditioning system, configured to supply conditioned air to a cabin of a vehicle, characterized in that it comprises a driven turbocompressor according to the invention configured to supply said cabin of the vehicle with pressurized air.

Advantageously and according to the invention, the air conditioning system comprises an air treatment device, configured to receive the pressurized air downstream of the inlet of the cabin and/or to receive the cabin air downstream of the energy recovery turbine, and comprising equipment intended to treat the pressurized air before the inlet of the cabin and/or to treat the air coming from the outlet of the cabin.

Advantageously and according to the invention, the air treatment device comprises one or several equipments from the following list:
- one or more additional compressors,
- one or more heat exchangers,
- a water extraction loop for extracting water,
- one or more expansion turbines.

The air treatment device thus groups together all of the equipment necessary for the air conditioning system in addition to the driven turbocompressor in order to obtain conditioned air to be supplied to the cabin and/or to treat the air at the cabin outlet.

The invention also relates to a vehicle comprising an air conditioning system and a cabin, characterized in that it comprises a driven turbocompressor according to the invention configured to supply the cabin with pressurized air.

The vehicle is for example an automobile, aeronautical, maritime or rail vehicle.

The invention also relates to a driven turbocompressor, a supply method, an air conditioning system, and a vehicle that are characterized in combination by all or some of the features mentioned above or below.

LIST OF FIGURES

Further aims, features and advantages of the invention will become apparent upon reading the following description, which is provided solely by way of non-limiting example, and which refers to the accompanying drawings, in which:

FIG. 1 is a schematic view of a driven turbocompressor of an air conditioning system in accordance with one embodiment of the invention,

DETAILED DESCRIPTION OF ONE EMBODIMENT OF THE INVENTION

For the sake of illustration and clarity, scales and proportions are not strictly adhered to in the drawings.

Moreover, identical, similar, or analogous elements are denoted using the same reference signs throughout the drawings.

FIG. 1 schematically illustrates a driven turbocompressor 10 forming part of an air conditioning system 100, arranged in particular to compress the air at the inlet of the air conditioning system to the pressure necessary to supply a cabin of the vehicle, and expand the air leaving the cabin to recover its energy in the form of enthalpy and improve the energy efficiency of the system.

The air conditioning system is configured to supply conditioned air, for example to a vehicle wherein it is embedded, in particular into the cabin or the passenger compartment of this vehicle (cabin of an aircraft or boat, car or wagon of a railway vehicle, passenger compartment of a motor vehicle, etc.). To generalize, the term "cabin" is used in the remainder of the description to name the cabin or the passenger compartment of a vehicle, depending on the type of vehicle wherein the invention is implemented.

The cabin 110 comprises a cabin inlet 112 and a cabin outlet 114 from which air that has passed through the cabin, called cabin air 24, exits.

The cabin 110 is supplied with pressurized air, in particular by a compressor 12 supplied with air by an air intake duct 14. The air originating from the air intake duct 14 is for example outside air, or air originating from another system on-board the vehicle which contains the air conditioning system. For example, in an aircraft, air can be taken from a propulsion engine.

The compressor 12 is rotated by a motor 16 surrounded by a casing 18. The motor rotates a transmission shaft 19 to which the compressor 12 is connected.

The air conditioning system generally comprises additional air treatment equipments, which are combined here in an air treatment device 120. Thus, the air treatment device 120 refers to all of the other constituent equipment of the air conditioning system in addition to the driven turbocompressor 10, for example one or more compressors, one or more turbines, one or more heat exchangers, a water extraction loop, etc.

The pressurized air, potentially treated by the air treatment device 120, enters through the inlet 112 of the cabin and then passes through the cabin 110.

The cabin air 24 is optionally treated at the outlet thereof by the air treatment device. The cabin air 24 is then expanded by an energy recovery turbine 26 of the driven turbocompressor 10. The energy recovery turbine 26 makes it possible to recover energy from the cabin air 24, by expanding and cooling this cabin air 24. In this embodiment, the energy recovery turbine 26 is connected to the transmission shaft 19 in order to reduce the energy consumption of the motor 16 when driving the compressor 12. The turbine 26, the motor 16 and the compressor 12 together form a driven turbocompressor 10.

In the prior art, the air leaving the energy recovery turbine is sent to the outside after energy recovery.

In the driven turbocompressor of the invention, the air leaving the turbine, called expanded air, is also used as a cooling source.

In particular, as shown in this embodiment, the expanded air 28 leaving the turbine 26 reaches a bifurcation 30. This bifurcation comprises an inlet connected to the outlet of the turbine 26 and makes it possible to direct some of the expanded air 28 towards a first outlet to a cooling duct 32, and the rest of the expanded air 28 to a first exhaust outlet 34a toward the atmosphere or toward a system or zone of the vehicle whose pressure is close to atmospheric pressure.

The part of the expanded air 28 circulating in the cooling duct 32 is directed to the casing 18 of the motor in order to cool the motor casing 18 and the motor 16. To facilitate cooling, the casing 18 of the motor may comprise fins (not shown) or any other device improving the heat exchange. Any droplets of water suspended in the expanded air 28 directed to the motor casing 18 improve the cooling by vaporization of these droplets under the effect of the heat generated by the motor 16 in order to drive the compressor 12. To maximize cooling, it is possible to inject water extracted by a water extraction loop of the water treatment device. After cooling the motor 16 and the casing 18 of the motor, the air can be discharged by a separate second exhaust outlet 34b, or else be redirected to the first exhaust outlet 34a.

The bifurcation 30 allows passive control of the pressure drop at the cooling duct 32 and the motor casing 18; the pressure at the first exhaust outlet 34a or the second exhaust outlet 34b is the ambient pressure and the pressure at the bifurcation 30 is the same for the part of the expanded air 28 circulating in the branch of the cooling duct 32 and the part of the expanded air 28 circulating in the branch leading to the first exhaust outlet 34a, which makes it possible to balance the flow rates between the two branches.

The air conditioning system incorporating the driven turbocompressor can be integrated into an automobile, rail, maritime or aeronautical vehicle.

The invention claimed is:

1. A driven turbocompressor of an air conditioning system for supplying conditioned air to a cabin of a vehicle, comprising:
   an air intake duct configured to collect ambient air at ambient pressure,
   a compressor connected to the air intake duct and to an inlet of the cabin, configured to receive air originating from the air intake duct, to compress the air originating from the air intake duct and to supply pressurized air at a pressure corresponding to a pressure needed to supply the cabin,
   a motor connected to the compressor by a transmission shaft, configured to drive the compressor and surrounded by a casing,
   an energy recovery turbine connected to an outlet of the cabin, and configured to expand cabin air originating from the outlet of the cabin to supply expanded air via an outlet of the turbine and condense water present in the cabin air to form droplets of water in suspension in the expanded air, and
   a cooling duct connecting the outlet of the turbine and the casing of the motor, said cooling duct being configured to directly supply at least some of the expanded air containing the droplets of water in suspension to the motor casing, so as to cool the motor casing and the motor.

2. The driven turbocompressor according to claim 1, wherein the energy recovery turbine is arranged on the transmission shaft.

3. The driven turbocompressor according to claim 1, wherein the turbo-compressor further comprises a bifurcation arranged between the outlet of the turbine and the cooling duct, the bifurcation comprising an inlet configured to receive the expanded air, and comprising at least two outlets, a first outlet configured to direct some of the expanded air to the cooling duct, and a second outlet configured to direct another portion of the expanded air to an exhaust outlet.

4. The driven turbocompressor according to claim 3, wherein the bifurcation is configured so that a majority of the water in the expanded air is directed to the cooling duct.

5. The driven turbocompressor according to claim 1, wherein the casing of the motor comprises cooling fins.

6. A method for supplying pressurized air to a cabin of a vehicle, comprising the following steps:
   compressing, via a compressor driven by a motor, air originating from an air intake duct to form pressurized air at a pressure corresponding to a pressure needed to supply the cabin, and directing the pressurized air to an inlet of the cabin,
   expanding, via an energy recovery turbine, cabin air originating from an outlet of the cabin,
   condensing, via the energy recovery turbine, water present in the cabin air to form droplets of water in suspension in air expanded by the turbine, and
   directing at least some of the air containing the droplets of water in suspension expanded by the turbine to a casing of the compressor motor so as to cool said motor casing and said motor.

7. An air conditioning system, configured to supply conditioned air to a cabin of a vehicle, the air conditioning system comprising a driven turbocompressor configured to supply said cabin of the vehicle with pressurized air, the turbocompressor comprising:
   an air intake duct configured to collect ambient air at ambient pressure,
   a compressor connected to the air intake duct and to an inlet of the cabin, configured to receive air originating from the air intake duct, to compress the air originating from the air intake duct and to supply pressurized air at a pressure corresponding to a pressure needed to supply the cabin,
   a motor connected to the compressor by a transmission shaft, configured to drive the compressor and surrounded by a casing,
   an energy recovery turbine connected to an outlet of the cabin, and configured to expand cabin air originating from the outlet of the cabin to supply expanded air via an outlet of the turbine and condense the water present in the cabin air to form droplets of water in suspension in the expanded air, and
   a cooling duct connecting the outlet of the turbine and the casing of the motor, said cooling duct being configured to directly supply at least some of the expanded air containing the droplets of water in suspension to the motor casing, so as to cool the motor casing and the motor.

8. The air conditioning system according to claim 7, wherein the system further comprises an air treatment device, configured to receive the pressurized air downstream of the inlet of the cabin and/or to receive the cabin air downstream of the energy recovery turbine, and comprising equipment configured to treat the pressurized air before the inlet of the cabin and/or to treat the cabin air coming from the outlet of the cabin.

9. The air conditioning system according to claim 8, wherein the air treatment device comprises one or more equipment from the following list:
   one or more additional compressors,
   one or more heat exchangers,
   a water extraction loop for extracting water,
   one or more expansion turbines.

* * * * *